United States Patent [19]

Carlucci et al.

[11] Patent Number: 5,191,645
[45] Date of Patent: Mar. 2, 1993

[54] DIGITAL SIGNAL PROCESSING SYSTEM EMPLOYING ICON DISPLAYS

[75] Inventors: John Carlucci, Sunnyvale; Kathlynn Uenaka, San Jose, both of Calif.

[73] Assignee: Sony Corporation of America, Park Ridge, N.J.

[21] Appl. No.: 660,662

[22] Filed: Feb. 28, 1991

[51] Int. Cl.[5] ............................................ G06F 15/20
[52] U.S. Cl. ................................. 395/159; 395/155; 395/161; 395/139; 340/706; 340/750
[58] Field of Search ...................... 364/518, 521, 522; 340/706, 747, 750; 395/139, 155, 160, 161, 159

[56] References Cited

U.S. PATENT DOCUMENTS

| | | |
|---|---|---|
| 3,610,815 | 10/1971 | Gould et al. |
| 3,721,757 | 3/1973 | Ettlinger |
| 3,824,336 | 7/1974 | Gould et al. |
| 4,538,188 | 8/1985 | Barker et al. |
| 4,660,101 | 4/1987 | Martin |
| 4,685,003 | 8/1987 | Westland |
| 4,717,971 | 1/1988 | Sawyer |
| 4,746,994 | 5/1988 | Ettlinger |
| 4,763,186 | 8/1988 | Belmares-Sarabia et al. |
| 4,862,251 | 8/1989 | Belmares-Sarabia et al. |
| 4,866,511 | 9/1989 | Belmares-Sarabia et al. |
| 4,945,498 | 7/1990 | Mitamura ............................ 364/521 |
| 4,970,664 | 11/1990 | Kaiser et al. ........................ 364/521 |
| 4,998,165 | 3/1991 | Lindstrom ............................ 358/81 |
| 5,001,696 | 3/1991 | Baldwin ............................... 364/521 |

FOREIGN PATENT DOCUMENTS 2247597 3/1992 United Kingdom .

OTHER PUBLICATIONS

Conversation with Larry Seehorn, "The Midas Touch", Videography journal, May 1989, pp. 78-81.
Seehorn Technologies Inc., "Midas I", one-page brochure, undated.
Seehorn Technologies Inc., "Midas II", nine-page brochure, Oct. 1988.
"CMX 6000 Random-Access Editing System", five-page brochure, Mar. 1987.
"Editdroid—The Editing System of Choice", six-page brochure, 1985.
"E-Pix Hybrid Editing System", four-page brochure, undated.
David Hughes, "EMC[2]: The New Editing Equation at Henninger Video", Videography Journal, p. 68.
"The Link Editing System", seven-page brochure, Oct. 1988.
"AVID/1 Media Composer—Product Description", two-page brochure, Apr. 1989.
"Montage Picture Processor—Product Specifications," four-page brochure, undated.
Pinnacle Systems, Inc., four-page brochure, undated.

*Primary Examiner*—Gary V. Harkcom
*Assistant Examiner*—Phu K. Nguyen
*Attorney, Agent, or Firm*—Limbach & Limbach

[57] ABSTRACT

A method and system for generating icon displays representing digitized film scenes and scene processing operations, and manipulating the icon displays to initiate selected processing operations (such as transfers from one storage location to another) on the scenes. The invention can be embodied in a film scanning system having circuitry for digitizing scanned film images, for digitally correcting the digitized scanned images, and for inserting video sync information into the corrected images to convert the corrected images into a video signal. The system is also capable of inserting digital data in such a video signal, such as film in and out points, and data identifying a video storage location, and then storing the resulting video signal as a video format scene. In addition to generating a scene from a sequence of digitized film frames and related digital data, the system of the invention generates an icon representing the scene by compressing a selected one of the frames in the sequence. In response to a user command for information regarding a scene, the system displays the compressed scene image and other relevant scene data. The system also displays scene processing icons. In response to user selection of a scene icon and a scene processing icon, the system executes the corresponding processing operation on the corresponding scene.

34 Claims, 11 Drawing Sheets

DIGITAL SIGNAL PROCESSING SYSTEM EMPLOYING ICON DISPLAYS

FIELD OF THE INVENTION

The invention is a system and method for generating icon displays representing digitized film scenes and scene processing operations, and manipulating the icon displays to initiate selected scene processing operations (such as transfers from one storage location to another) on the scenes themselves.

BACKGROUND OF THE INVENTION

Conventional motion picture film comprises frames that are displayed sequentially at a frame rate of 24 frames per second (24 fps), or 30 fps, or some other rate. Required special effects may embodied in the displayed film.

Systems (including "telecine" systems) have been developed for converting motion picture film into video signals. These systems generate a video signal from motion picture film images by scanning the film frames sequentially to generate digitized film images. They then convert the digitized images into a video signal having a standard video frame rate (25 video frames per second for PAL video, 29.99 video frames per second for NTSC video, or 30 video frames per second for SMPTE-240M high definition video). Each video frame consists of two fields.

Conventional film scanning systems typically include circuitry for performing color correction on scanned images in real time (either before or after the images are digitized). To enable a user to perform color correction in a convenient manner, some conventional systems of this type are capable of generating a composite video signal comprising complementary portions of a color corrected image and a reference image, for split screen display on a video monitor.

During color correction, the user typically defines a "test" set of color correction parameters, and the system generates a "test" color corrected signal by processing one or more scanned images in accordance with a color correction algorithm determined by the test parameters. The user can then refine the test parameters. For example, the user can refine the test parameters to cause the system to produce a color corrected signal which, when displayed, has a color appearance matching that of a reference image.

However, until the present invention, convenient user interface software had not been developed for initiating selected processing operations on selected digitized film scenes. Nor had conventional systems generated icons representing digitized film scenes and scene processing operations (such as the operation of transferring a scene from one storage location to another) for use in initiating selected processing operations on selected ones of the scenes.

SUMMARY OF THE INVENTION

The invention is a system and method which generates one or more signals known as "scenes" from digitized film images. Throughout this specification, including in the claims, the terms "scene" and "scene signal" are used interchangeably to denote a signal including the following components: data representing a sequence of digitized film frames (suitable for conversion into a video signal for display on a video monitor); digital data representing the first film frame in the sequence and optionally also the "last film frame plus one" in the sequence (such first film frame and the last film frame plus one will sometimes be identified herein, respectively, as the scene's "film in-point" and "film out-point"); and at least one set of color adjustment parameters (or reference frame identification codes representing color adjustment parameters) for color correcting the sequence of film frames.

The invention can be embodied in a film scanning system having circuitry for digitizing scanned film images, for digitally correcting the digitized scanned images, and for generating a video signal by inserting video sync information into the digital data stream representing the corrected images. The system is also capable of inserting digital scene information data into such a video signal, and then transferring the resulting video format scene to video tape, thus permitting subsequent non-real-time color correction of the scanned film images.

The scene information can include the video storage location of the video format scene (for example, the first and last video frames of a video tape segment on which the scene has been recorded, which are sometimes identified herein, respectively, as the "video in-point" and "video out-point"), an identification of the film in-point and film out-point for the scene, and one or more sets of color adjustment parameters for the scene. Such color adjustment parameter data can be included in a video format scene whether or not the digitized film frames of the scene have actually been color corrected in accordance with the color adjustment parameter data. For example, the digitized film frames comprising a video format scene may pass through a disabled color processor (i.e., color processor 72 to be discussed below) without undergoing color correction before they are converted to video format (i.e., in processor 74 to be discussed below) and stored on video tape.

The system generates a scene icon for each scene, and a set of one or more "scene processing" icons (including "scene transfer" icons) representing scene processing operations, and manipulates the icons to perform selected scene processing operations on selected scenes (such as transfers of a scene from one storage location to another). For example, when the user drags a scene icon to a scene transfer icon using a trackball or mouse, the system executes a corresponding scene transfer operation on the selected scene.

The inventive system generates each scene icon by compressing a selected digitized film frame from the film frame sequence represented by the scene. In response to a user command for information regarding a scene, the system displays the scene icon on a computer graphics monitor, along with additional scene data, such as data identifying the scene's film in-point, film out-point, and a video storage location of the video format version of the scene.

DETAILED DESCRIPTION OF THE PREFERRED EMBODIMENT

Figure 1:
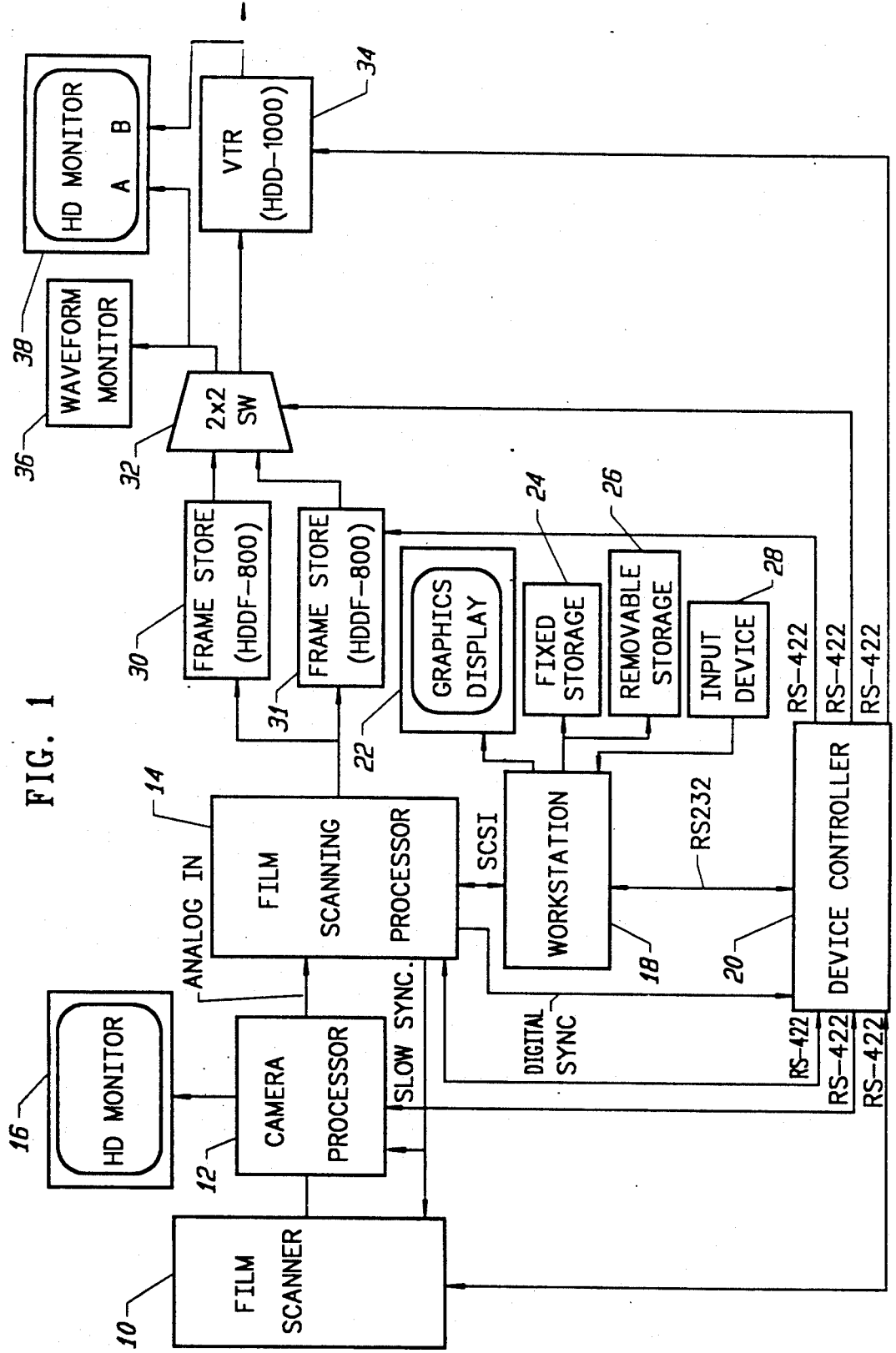
FIG. 1 is a block diagram of a film to video conversion system embodying the invention.

The apparatus of the invention can be embodied in the apparatus disclosed in each of the following patent applications, each assigned to the assignee of the present application: "Non-Real-Time Film Scanning System," by P. Capitant, D. Hodgson, and V. Perry, filed on Aug. 7, 1991; "Method and Apparatus for Flare Correction," by D. Hodgson and Y. Levy, filed on Aug. 19, 1991; "Digital Color Correction System and Method," by P. Capitant, V. Perry, C. Collier, and J Carlucci, filed on Jun. 5, 1991; "Digital Video Color Processor with Anti-Aliasing Filter," by D. Hodgson, filed on Aug. 7, 1991; "Film-to-Video Frame Image Conversion Apparatus and Method for Selectively Identifying Video Fields and Frames," by P. Capitant, D. Hodgson and V. Perry, filed on May 14, 1991; "Digital Video Processing System with Bordered Split Screen Display," by P. Capitant, D. Hodgson, and V. Perry, filed on Aug. 5, 1991; and "Digital Video Processing System with Mixer Prefilter," by D. Hodgson, filed on Jul. 24, 1991. The specification of each listed application is incorporated herein by reference.

We contemplate that the invention may be embodied in a film scanning and processing system of the type shown in FIGS. 1-9. The system of FIG. 1 includes film scanner 10 and camera processor 12. Film scanner 10 transports motion picture film (color or black and white) past camera processor 12, which includes a video camera and related analog video signal processing circuitry. Camera processor 12 images each film frame adjacent to it, and generates an analog signal representing each film frame.

In a preferred embodiment, the motion picture film is imaged by camera processor 12 at a rate of 1.875 frames per second ("1.875 fps"), as scanner 10 transports the film past camera processor 12 at that rate (1.875 fps). Camera processor 12 preferably generates analog high definition video signals, such as analog high definition video signals having SMPTE-240M format.

The analog output of camera processor 12 is supplied to film scanning processor 14, and is optionally also displayed on monitor 16. Within film scanning processor 14, the analog video signals from camera processor 12 are digitized, and various digital signal processing operations (to be discussed in detail below with reference to FIGS. 2-6) are performed digitally on the digitized video data.

Circuitry (to be discussed below with reference to FIG. 6) within processor 14 typically also performs digital color correction on the output of input processor 70 of processor 14. Flare correction is also performed, preferably digitally, by circuitry within processor 14.

Computer 18 interfaces with, and controls processor 14 and device controller 20. In response to user commands sent from computer input device 28 to computer 18, computer 18 instructs processor 14 to perform signal processing operations selected by the user, and computer 18 instructs controller 20 to send user-selected control signals to processor 12, scanner 10, frame storage units 30 and 31, 2×2 switch 32, and video recording and playback unit 34.

In a manner to be described below with reference to FIGS. 10 and 11, the system user can define "scenes" representing sequences of digitized film frames represented by the digital signal asserted at the output of film scanning processor 14. The digital signal asserted at the output of processor 14 can be stored in either or both of frame storage units 30 and 31. In response to control signals from control processor 76 (shown in FIG. 2), selected frames stored within field stores 120 (shown in FIG. 7) are supplied to image compression circuit 15 of output processor 74. Circuit 15 generates a compressed image signal from each frame supplied thereto, for display as a "scene icon" on graphics monitor 22.

Computer 18 receives the compressed image signals generated by circuit 15 (and routed from circuit 15 through control processor 76) and stores them (for example, in storage means 22 or 24). In accordance with the invention, computer 18 instructs control processor 76 to cause circuit 15 to generate a compressed image signal for each "scene" created in response to a user command. Each such compressed image signal thus represents a scene, since it represents a single frame from a film frame sequence in turn represented by the scene.

Alternatively, stored video frames (which do not represent digitized film frames) can be written from field stores 120 to compression circuit 15, for conversion into icons for display on monitor 22.

Computer 18 stores additional information regarding each "scene" for display on monitor 22 (for example in the format shown in FIG. 10 to be discussed below). Computer 18 also generates and stores "scene processing icons," such as those discussed below with reference to FIG. 11, and displays the scene processing icons on monitor 22.

In a preferred embodiment, computer 18 is a workstation (such as a NEWS 1850 workstation, available from Sony Corporation) connected by an SCSI interface to processor 14. Computer 18 is connected by an RS232 interface to controller 20, and is also connected by an RS422 interface to processor 12, scanner 10, frame storage units 30 and 31, switch 32, and video recording and playback unit 34. In one preferred embodiment, units 30 and 31 are Model HDDF-500 high definition video frame store units available from Sony Corporation, and recording and playback unit 34 is a Model HDD-1000 high definition video recorder available from Sony Corporation.

Also connected to computer 18 are fixed data storage means 24 (which may be a hard disk drive) and removable data storage means 26 (which may be a floppy disk drive), and graphics display 22 (preferably, a high resolution color graphics display).

Preferably, computer input device 28 includes a touch tablet for finger selection of menu items and icons displayed on monitor 22, a trackball (or mouse) for selecting color and image areas displayed on monitor 22, and a keyboard for entering text, user notes, and processing parameters.

After the digitized video data are processed digitally in processor 14, the processed data are stored on a frame-by-frame basis in frame stores 30 and 31. Switch 32, under control of controller 20, connects desired ones of frame stores 30 and 31 to video recording and playback unit 34 and to waveform monitor 36 and video monitor 38 (which is preferably a high definition video monitor). To maximize the system's throughput rate, as a frame of data is read out (or multiple frames of data are read out) from one of frame stores 30 and 31, the next frame (or set of frames) of data should simultaneously be written into the other one of frame stores 30 and 31. In such an operating mode, switch 32 connects alternating ones of frame stores 30 and 31 to unit 34 (and optionally also to monitors 36 and 38).

Figure 2:
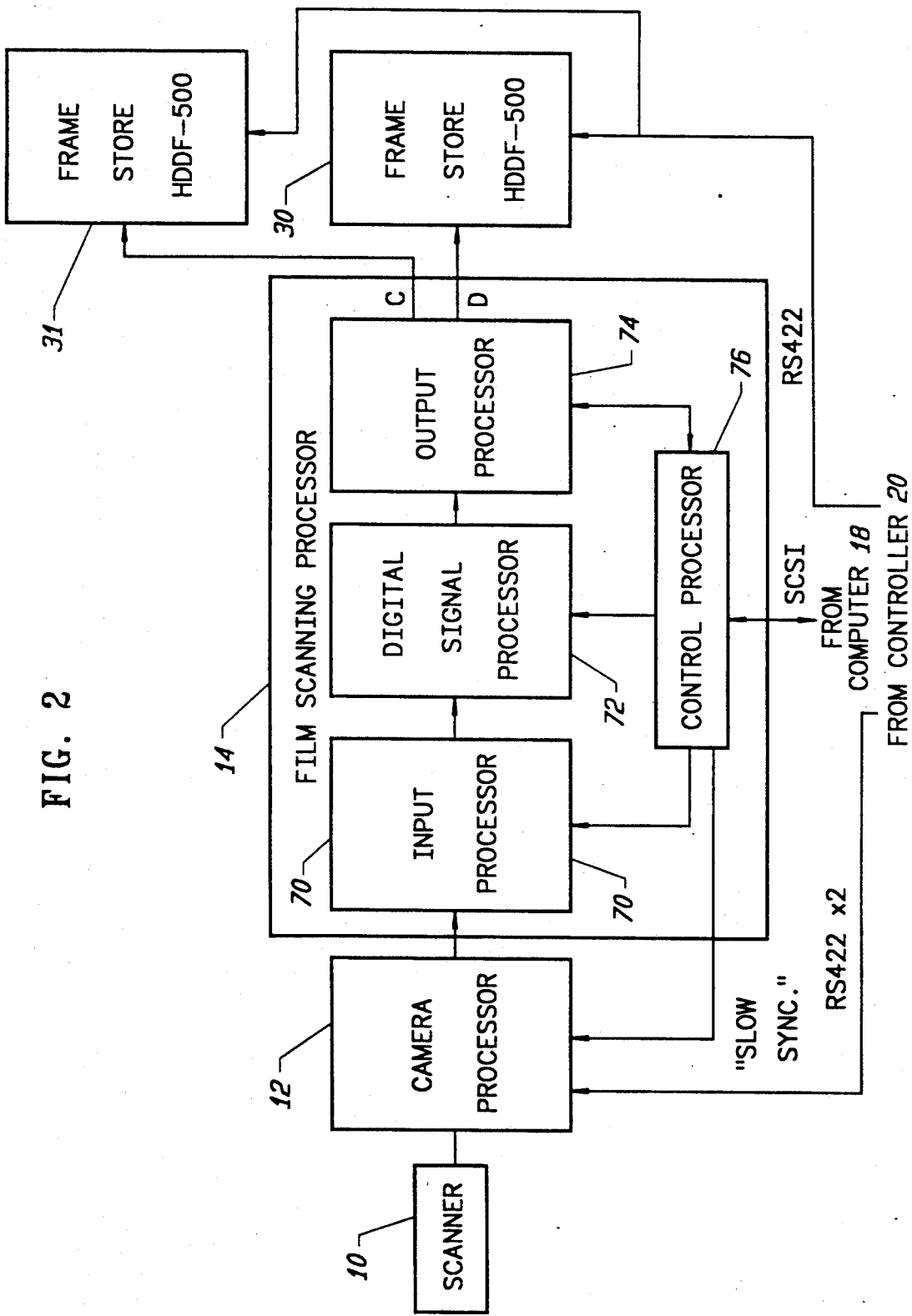
FIG. 2 is a block diagram of a portion of the FIG. 1 system.

The preferred embodiment of film scanning processor 14 shown in FIG. 2 includes input processor 70 (which receives the analog output of camera processor 70), digital signal processor 72, output processor 74, and control processor 76. Input processor 70 digitizes the analog input signal, performs preliminary corrections on the resulting digitized data, and supplies the preliminarily processed digitized data to digital signal processor 72 for color correction. The color corrected data generated in processor 72 are supplied through output processor 74 to frame stores 30 and 31. Processors 70, 72, and 74 operate under control of control processor 76, which in turn receives instructions from computer 18 over an SCSI interface.

In one class of embodiments, control processor 76 generates a synchronization signal for reading out (discharging) an image sensor means within camera processor 12. Preferably, the image sensor means is read out at a low rate (such as 1.875 fps) in response to a correspondingly low rate synchronization signal ("slow sync") from processor 76.

Figure 3:
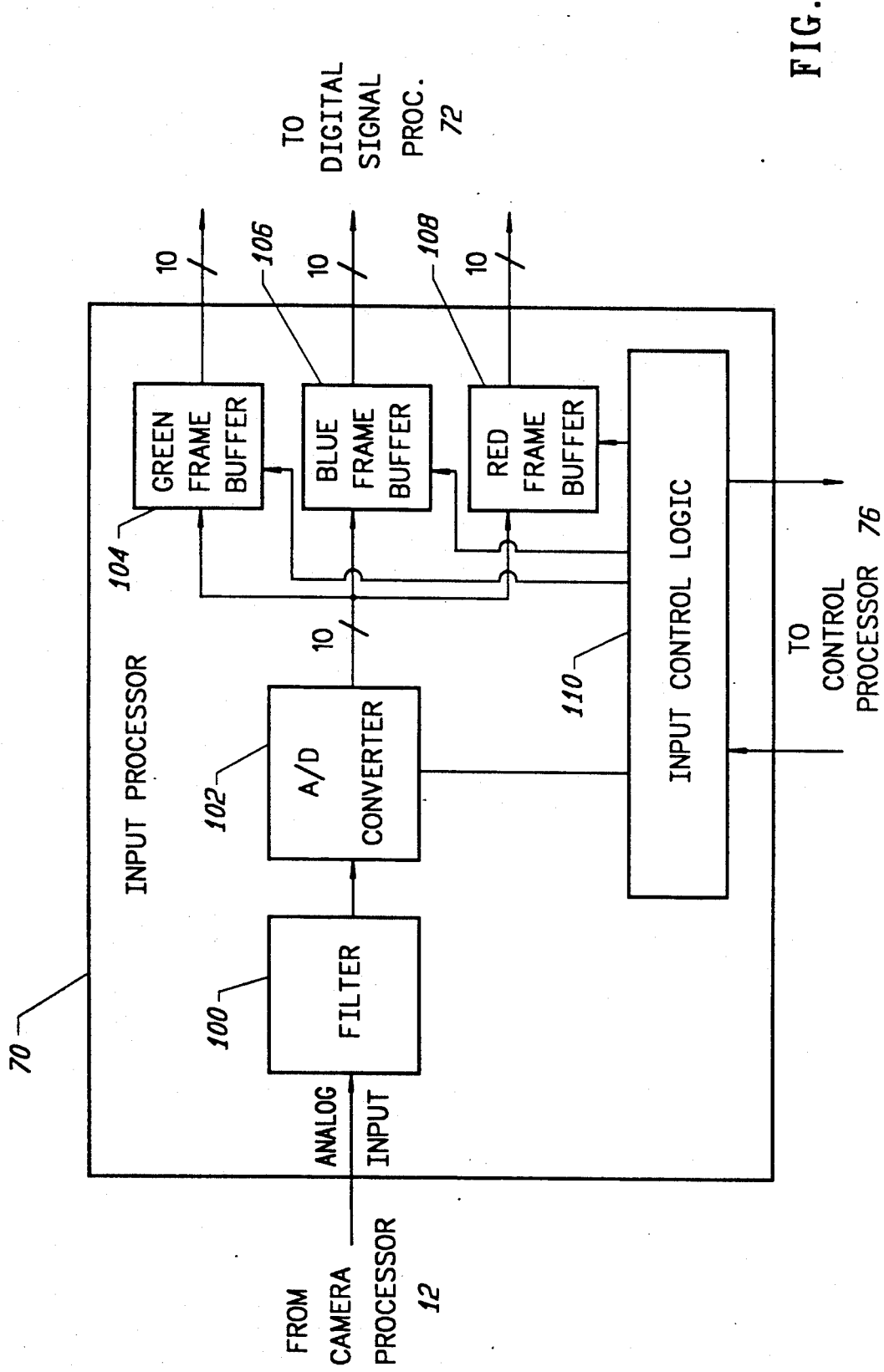
FIG. 3 is a block diagram of the input processor shown in FIG. 2.

A preferred embodiment of input processor 70 is shown in FIG. 3. The analog input signal supplied to processor 70 consists of frames, each comprising 2200×1125 pixels. Each frame consists of 1125 lines, including an even field, an odd field, and ninety lines which comprise the vertical blanking interval (which contain synchronization information). There are 1920 pixels of active video per line, and the remaining 280 pixels comprise the horizontal blanking interval.

The analog input signal is supplied from camera processor 12 (preferably over a 75 ohm coax cable) to filter/amplifier circuit 100. Circuit 100 includes an amplifier for amplifying the analog input signal, circuitry for separating the sync and video portions of the input signal, and a low pass filter for filtering the video portion of the input signal to enhance resolution during digitization. In one embodiment, the cutoff frequency of the low pass filter within circuit 100 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog output from filter 100 is digitized in analog-to-digital conversion circuit 102. In a preferred embodiment, circuit 102 implements 10-bit quantization, in which case the digital data generated by circuit 102 will comprise ten parallel digital data streams. In order to perform 10-bit quantization with relatively simple, inexpensive analog-to-digital conversion circuitry 102, we prefer that the output frame rate of camera processor 12 should equal 1.875 fps. When the output frame rate of camera processor 12 is 1.875 fps, the digital data emerging from circuit 102 has a data rate of 18.56 MHZ (one fourth the real-time SMPTE-240M high definition video clock rate, 74.25 MHz).

The digital video data generated by A/D converter 102 are supplied to green frame buffer 104, blue frame buffer 106, and red frame buffer 108. The output of camera processor 12 is time division multiplexed, typically in the following sequence: two fields of blue data, then two fields of green data, then two fields of red data, and finally two fields of gray data. Input control logic circuitry 110 (operating under control of control processor 76) causes frames of blue digital data ("$B_{in}$"), green digital data ("$G_{in}$"), and red digital data ("$R_{in}$") from A-to-D converter 102 to be written sequentially (on a frame-by-frame basis) into buffer 106, then into buffer 104, and next into buffer 108. The gray frames are not normally written into any of buffers 104, 106, and 108.

Blue, green, and red data are written sequentially into buffers 104, 106, and 108 at the source rate (typically, 1.875 frames per second). Blue, green, and red data are read out in parallel from buffers 104, 106, and 108 (to produce three parallel data streams, each representing a different 10-bit color channel) at four times the source rate. Thus, each color channel output from buffers 104, 106, and 108 typically has a frame rate of 7.5 frames per second (one fourth of a proposed standard SMPTE-240M digital video frame rate). In order to achieve the described four-fold increase in frame rate, each bit written into one of buffers 104, 106, and 108, is read out four times from that buffer.

Preferably, each of buffers 104, 106, and 108 is a double buffer, including a first memory, and a second memory into which data can be written while data (previously written into the first memory) is read from the first memory.

As mentioned, the gray frames are not normally written into any of buffers 104, 106, and 108. However, in one class of embodiments, the system has an optional operating mode in which gray frames are read from input processor 70 at four times the source rate at which they are supplied to processor 70. In one such embodiment, a double gray frame buffer is connected in parallel with buffers 104, 106, and 108. One memory within the double gray frame buffer is filled while the other memory therein is read (at four times the source rate) to processor 72. In another of such embodiments, the gray frames (rather than the red, green, and blue frames) are read into one or more of buffers 104, 106, and 108.

Figure 4:
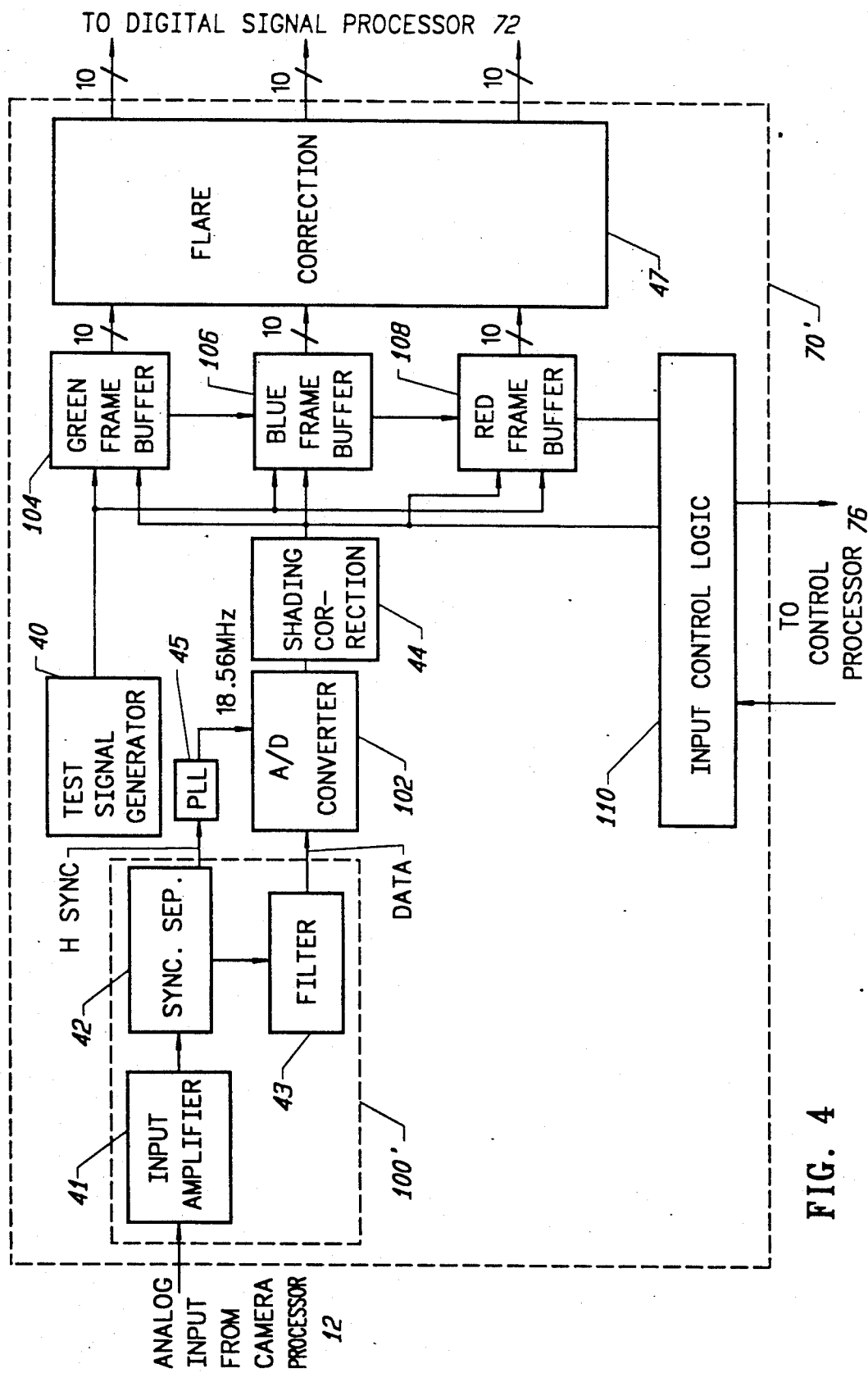
FIG. 4 is a block diagram of an alternative preferred embodiment of the input processor shown in FIG. 2.

In the embodiment of FIG. 4, input processor 70' includes means for performing shading correction on the digital output of A-to-D converter 102. Preferably, the shading correction is performed before the flare correction is performed on the data. In order to perform shading correction, a set of black shading correction signals and a set of white shading correction signals must be generated. In contrast with flare correction signals which compensate for undesired luminance variation due to optical scatter from frame to frame within each color channel, the shading correction signals compensate for undesired luminance variation within each frame due to CCD pattern noise.

The black shading correction signals are preferably generated in the following manner. Camera processor 12 and input processor 70′ (or input processor 70 of FIG. 2) are operated to generate red, green, and blue digital data collectively representing a "black" motion picture frame. This is conveniently accomplished by positioning a lens cap over the lens of the camera within unit 12, and then operating unit 12 to generate a red frame of data, a green frame of data, and a blue frame of data. The average luminance of each frame is then computed. Then, for each frame, the difference is computed between the luminance of each pixel of the frame, and the frame's average luminance. These difference signals (scaled by a pre-selected constant factor) are employed as red, green, and blue shading correction signals.

White shading correction is performed in a similar manner to black shading correction, except that the white shading correction signals are employed as multiplicative factor signals (rather than additive correction signals) to correct the red, green, and blue data streams.

In one class of embodiments, each of frame buffers 104, 106, and 108 includes two memory blocks, each having 1M×12 bit capacity. Each 1M×12 bit block includes three commercially available 1M×4 bit memory circuits. However, in a preferred embodiment within this class, only the ten most significant bits of the data are utilized (in the sense that each pixel read from any of buffers 104, 106, and 108, consists of ten parallel bits).

A preferred embodiment of an input processor which includes flare correction, shading correction, and lift variation correction circuitry will next be described with reference to FIG. 4. Input processor 70′ of FIG. 4 is identical to input processor 70 of FIG. 3 except in the following respects. The analog input signal is supplied from camera processor 12 (preferably over a 75 ohm coax cable) to filter/amplifier circuit 100′. Circuit 100′ includes input amplifier 41, sync separation circuit 42 for separating the horizontal sync, vertical sync, and video data portions of the input signal, and low pass filter 43 for filtering the video data portion of the input signal to reduce aliasing. In one embodiment, the cutoff frequency of low pass filter 43 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog data stream output from filter 43 is digitized in analog-to-digital conversion circuit 102. In a preferred embodiment, the H Sync signal from sync separation circuit 42 is multiplied by 2200 in phase-locked loop 45 to generate an 18.56 MHz clock signal, and this 18.56 MHz clock signal is supplied to A-to-D conversion circuit 102, wherein it is employed to sample the input analog data at a data rate of 18.56 MHz.

In one operating mode, the digital video data generated by A-to-D converter 102 are supplied directly to green frame buffer 104, blue frame buffer 106, and red frame buffer 108 at the source rate (typically, 1.875 frames per second). Blue, green, and red data are read out in parallel from buffers 104, 106, and 108 (to produce three parallel data streams, each representing a different 10-bit color channel) at four times the source rate. In order to achieve the described four-fold increase in frame rate, each bit written into one of buffers 104, 106, and 108, is read out four times from that buffer.

In the normal operating mode, the digital data from A-to-D converter 102 are supplied to circuit 44, for shading correction. The corrected red, green, and blue frames output from circuit 44 are written sequentially into frame buffers 104, 106, and 108.

In an alternative operating mode of input processor 70′, data from test signal generator 40 (rather than from correction circuit 44) are written sequentially into frame buffers 104, 106, and 108. This test data can represent a test image (or sequence of images). Such test image (or images) can be compressed in circuit 15 (after being routed through processor 72 to processor 74) to generate an icon for display in the "local bin" area of the FIG. 11 display (to be discussed below).

The red, green, and blue data streams read out from frame buffers 104, 106, and 108 undergo flare correction (and optionally also lift variation correction) in circuit 47. The corrected red, green, and blue data streams asserted at the output of circuit 47 undergo further processing in digital signal processor 72 (shown in FIGS. 2 and 5).

Figure 5:
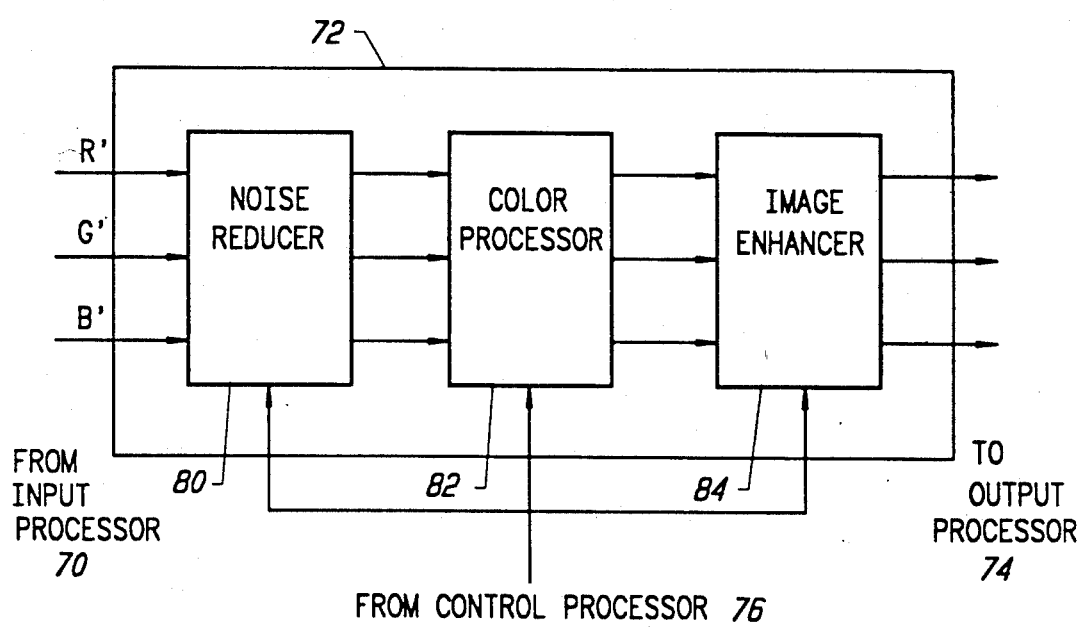
FIG. 5 is block diagram of the digital signal processor shown in FIG. 2.

The preferred embodiment of digital signal processor 72 shown in FIG. 5 includes a noise reduction circuit 80, which receives the data streams supplied from frame buffers 104, 106, and 108 of input processor 70 (or circuit 47 of input processor 70′). Noise reduction circuit 80 should include a circuit for reducing film noise (including film grain noise and scratches) and image pickup system noise (including noise relating to the system's optics and image sensor, as well as associated electronic noise).

As indicated in FIG. 5, the output of noise reduction circuit 80 undergoes digital color correction in color processor 82, and then digital image enhancement in image enhancement circuit 84. Preferably, digital signal processor 72 processes the digital data at an internal processing rate substantially greater than the scanning rate of camera processor 12. For example, if the scanning rate is 1.875 fps, the internal processing rate of processor 72 may desirably be 7.5 fps.

Figure 6:
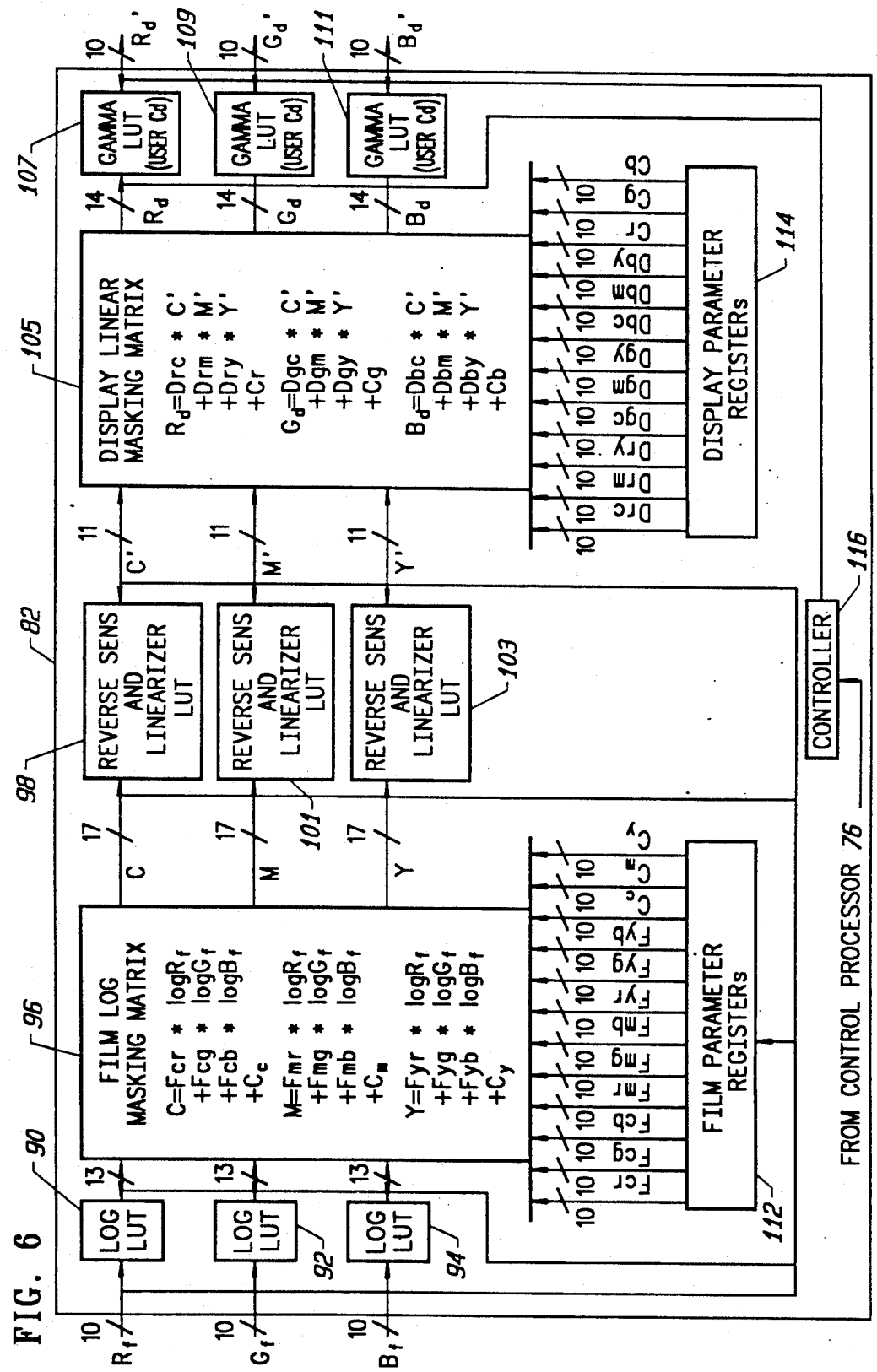
FIG. 6 is block diagram of the color processor shown in FIG. 5.

FIG. 6 is a preferred embodiment of color processor 82. The FIG. 6 apparatus is designed to perform a limited type of color transformation, namely the transformation of the colors of the digitized images generated by camera processor 14 (as a result of scanning motion picture film) into colors that would have been generated if the subject had been imaged directly by a video camera (i.e., without intermediate filming and film scanning steps). If desired, a more complicated and versatile color correction means, for example a "paint" system having the capability to perform a wide range of color transformations, may be substituted for the apparatus of FIG. 6.

The FIG. 6 apparatus includes a film transform section and a display transform section. The film transform section includes logarithm look-up tables 90, 92, and 94, masking matrix 96, parameter registers 112, and "reverse sensitometry and linearizing" look-up tables 98, 101, and 103. Display transform section includes masking matrix 105, parameter registers 114, and gamma function multiplication means 107, 109, and 111.

A logarithm operator is applied to each of the red, green, and blue 10-bit input pixels in look-up tables 90, 92, and 94, to generate a 13-bit value for each 10-bit input pixel. More particularly, logarithm look-up tables 90, 92, and 94 compute the logarithms of the red, green, and blue input pixels, by multiplying them by pre-stored log transformation parameters to generate 13-bit log domain output data.

Masking matrix 96 transforms the log domain data asserted at the outputs of look-up tables 90, 92, and 94 to correct for crosstalk between film dyes, interlayer inter-image effects, and the effects of colored coupler masking as seen by camera processor 14. Masking matrix coefficients $F_{cr}$, $F_{cg}$, $F_{cb}$, $F_{mr}$, $F_{mg}$, $F_{mb}$, $F_{yr}$, $F_{yg}$, and $F_{yb}$, and parameters $C_c$, $C_m$, and $C_y$, are determined by the spectral absorption of the film dyes and the spectral sensitivity of camera processor 14's image pickup system, and are stored in registers 112 in response to control signals supplied from controller 116 (in response to control signals from control processor 76). The data pixels asserted at the outputs of masking matrix 96 are proportional to equivalent cyan, magenta, and yellow film densities, and hence are grouped into the channels labeled "C", "M", and "Y".

The equivalent dye densities are related in a well-known manner to selective film exposures by sensitometric and characteristic curves. For this reason, the "cyan" data generated in masking matrix 96 undergoes gamma correction and reverse sensitometry processing, as well as inverse-log transformation in look-up table 98. Similarly, the "magenta" data generated in masking matrix 96 undergoes gamma correction, reverse sensitometry, and inverse-log transformation in look-up table 101, and the "yellow" data generated in masking matrix 96 undergoes gamma correction, reverse sensitometry, and inverse-log transformation in look-up table 103.

Display section linear masking matrix 105 next transforms the linear domain data asserted at the outputs of look-up tables 98, 101, and 103 to compensate for the overall non-ideal spectral characteristics of the system as a whole (including the motion picture film being scanned, camera processor 14, and monitor 38). The masking matrix coefficients $D_{rc}$, $D_{rm}$, $D_{ry}$, $D_{gc}$, $D_{gm}$, $D_{gy}$, $D_{bc}$, $D_{bm}$, and $D_{by}$, and parameters $C_r$, $C_g$, and $C_b$, that are employed to process the CMY data pixels in display linear masking matrix 105 are stored in parameter registers 114.

Masking matrix coefficients $D_{rc}$, $D_{rm}$, $D_{ry}$, $D_{gc}$, $D_{gm}$, $D_{gy}$, $D_{bc}$, $D_{bm}$, $D_{by}$, $F_{cr}$, $F_{cg}$, $F_{cb}$, $F_{mr}$, $F_{mg}$, $F_{mb}$, $F_{yr}$, $F_{yg}$, and $F_{yb}$, and parameters $C_r$, $C_g$, $C_b$, $C_c$, $C_m$, and $C_y$ are preferably selected by the user in the following manner. A test frame, from a sample of motion picture film of the same type as the film to be color-corrected, is scanned. Output processor 74 generates a composite video signal (in a manner to be explained in greater detail below) by combining portions of the test frame and a comparable reference frame. Monitor 38 displays the composite signal as a split screen image (with complementary portions of the test frame and the reference frame in distinct regions of the split screen). To generate the composite signal, control processor 76 reads out the reference frame from one of frame stores 120-127 under the control of computer 18.

While viewing the test frame and the reference frame, the user selects the processing coefficients and parameters interactively (by entering commands to input device 28 in response to menus displayed on computer graphics monitor 22) to achieve a desired visual appearance of the two displayed images.

In a variation on this procedure, the user selects a set of processing coefficients and parameters for each of a number of selected motion picture film frames (preferably using different corresponding pre-stored reference frames for each selected motion picture film frame), and computer 18 downloads each selected set of coefficients and parameters through control processor 76 and controller 116 at appropriate times to registers 112 and 114. Computer 18 also automatically generates coefficients and parameters for intermediate film frames (i.e., film frames for which the user did not specifically select coefficients and parameters) by employing an interpolation technique, and downloads these interpolated coefficients and parameters (at appropriate times) to registers 112 and 114.

After the data pixels asserted at the outputs of look-up tables 98, 101, and 103, are processed in display linear masking matrix 105, they are proportional to red, green, blue HDVS high definition video pixels and hence are grouped into the channels labeled "$R_d$", "$G_d$", and "$B_d$". Each of the $R_d$, $G_d$, and $B_d$ data streams is processed in a corresponding one of gamma function multiplication circuits 107, 109, and 111, to compensate for the nonlinear characteristics of the display monitor. In one class of embodiments, each of multiplication circuits 107, 109, and 111 is implemented as a single look-up table comprising a read-only memory which stores a set of transform parameters to be applied to all input pixels in the relevant RGB channel.

However, an implementation employing a single look-up table for each RGB channel may undesirably introduce aliased data components into the data which cannot practically be subsequently removed.

Accordingly, we prefer to implement each of multiplication circuits 107, 109, and 111 as a set of N parallel look-up tables (each for applying a different term of an N-degree polynomial to the data) with a low-pass filter for pre-filtering the input data supplied to each look-up table. In this preferred embodiment, the data supplied to each look-up table are pre-filtered in the corresponding filter to eliminate high frequency components of the data which would otherwise introduce aliased signal components into the output of the look-up table. Within each color channel, each low-band-pass filter preferably passes a different frequency band, with the cut-off frequencies for the filters corresponding to higher-order polynomial terms exceeding the cut-off frequencies for the filters for lower-order polynomial terms.

The output of color processor 82 preferably undergoes image enhancement in image enhancement circuit 84 (shown in FIG. 5) prior to subsequent processing in output processor 74. Image enhancement means 84 preferably performs both edge enhancement and softening. In alternative versions of digital signal processor 72 shown in FIG. 5, noise reduction means 80 or image enhancement means 84 (or both means 80 and means 84) are omitted.

Figure 7:
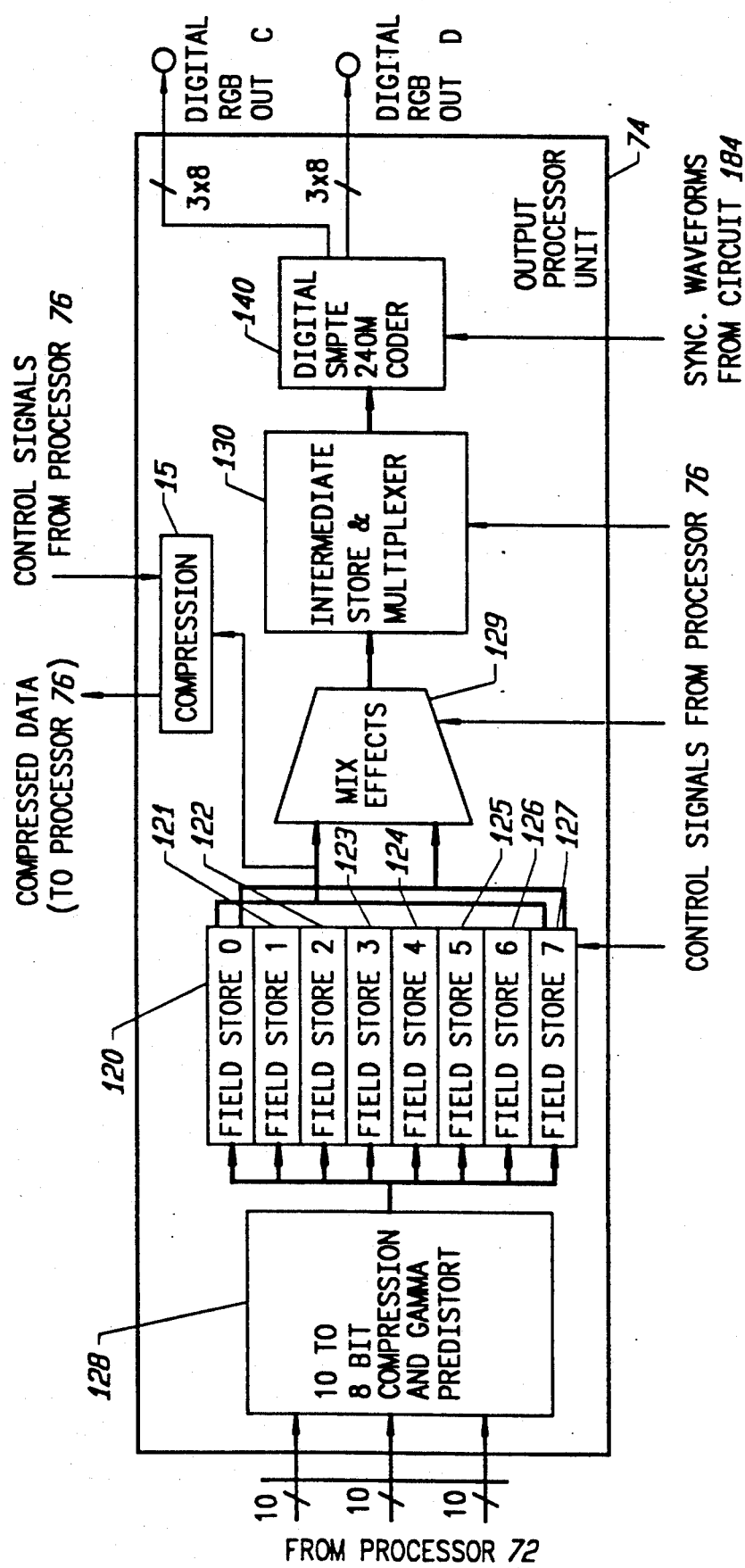
FIG. 7 is block diagram of the output processor shown in FIG. 2.

The preferred embodiment of output processor 74 shown in FIG. 7 includes compression circuit 128, which receives digitized frames of 10-bit parallel data from digital signal processor 72, and compresses the 10-bit parallel data stream into an 8-bit parallel data stream. The 8-bit data stream is written into a selected sequence of assembly field stores 120-127 in response to control signals supplied from control processor 76 to the field stores 120-127 (only one of field stores 120-127 receives data at a time). One or more digitized reference fields (typically, two reference fields which comprising a reference frame) are also stored in selected ones of field stores 120-127.

Five of field stores 120-127 are required to perform the 3-2 pulldown scanning process to be described below. Typically, two of field stores 120-127 are employed to store reference fields which comprise a reference frame.

Compression circuit 128 optionally also includes circuitry for performing display gamma predistortion on the 8-bit parallel data before the data are written into field stores 120–127.

As indicated in FIG. 7, data may be read from any two of field stores 120–127 in parallel, to produce two 8-bit parallel digital data streams A and B (for each color channel). In one typical case, data stream A represents a color-corrected motion picture film frame from digital signal processor 72, and data stream B represents a reference video frame pre-stored in the field stores.

Data are written into (and read out from) field stores 120–127 in response to control signals from processor 76. In one embodiment, a 3-2 pulldown process is implemented to write data from the field stores. Such a 3-2 pulldown process typically contemplates that camera processor 12 scans a motion picture film at a frame rate of (24/N) fps, where N is an integer, as the film advances through scanner 10 at the same rate (24/N fps). In one embodiment, $N=16$, so that camera processor 12 generates video frames at a rate of 1.5 frames per second. In this embodiment, digital data are read from input processor frame stores 104, 106, and 108 at the rate of 6 frames per second (12 fields per second), and written into field stores 120–127 at the same rate (12 fields per second).

Circuit 128 includes means for demultiplexing each frame of data it receives into its constituent odd $f_O$ and even $f_E$ fields, so that individual even or odd fields can be selectively written into fields stores 120–127. In general, to implement the 3-2 pulldown process, individual fields are written sequentially into field stores 120–127, and different sequences of fields (including some duplicate odd $f_{OD}$ and even $f_{ED}$ fields) are read from the field stores (at a higher field rate) to produce frames of output video data. Each frame of output video data includes one odd $f_O$ and one even $f_E$ field. In one embodiment, fields are written into field stores 120–127 at the rate of 12 fields per second, and are read out from fields stores 120–127 at the rate of 15 fields per second.

For example, in response to control signals from processor 76, fields can be written from circuit 128 into selected ones of field stores 120–127 in the following sequence: during a first timing cycle, fields $F_1F_O$ and $F_1F_E$ of the first input frame $F_1$, are written into field stores 120 and 121, respectively. During the next timing cycle, the two fields comprising the second input frame $F_2$ are written into field stores 122 and 123, respectively. Similarly, during subsequent timing cycles, subsequent input frames $F_N$ are written into selected pairs of field stores 120–124, or reference fields are written into field stores 125–126.

During the first output timing cycle, fields $F_1F_O$ and $F_1f_E$ corresponding to the first input frame $F_1$ are read from field stores 120 and 121. During the second output timing cycle, the odd field from the first input frame is output again as a duplicate field $F_1F_{OD}$, along with the even field $F_2f_E$ of the second input frame $F_2$. Subsequent fields are similarly output (for example, in the sequence described in detail in the above-referenced patent application entitled "Film-to-Video Frame Image Conversion Apparatus and Method for Selectively Identifying Video Fields and Frames," by P. Capitant, D. Hodgson and V. Perry, filed on May 14, 1991.

Rate conversion (for example, from the rate of 12 fields per second to the rate of 15 fields per second) is thus achieved by reading out stored fields repeatedly from selected ones of stores 120–127. In one embodiment, data are read from field stores 120–127 at a rate of 60 fields per second (30 fps), and processed in circuit 129, written into circuit 130, and read out from circuit 130 at that rate (30 fps). In another embodiment, data are read from field stores 120–127 at a rate of 15 fields per second (7.5 fps), processed in circuit 129 and written into circuit 130 at the rate of 7.5 fps, but read out from circuit 130 at the rate of 30 fps.

The digital video data stream asserted at the output of circuit 129 includes "artificial" frames comprising even and odd fields from different input frames). Such artificial frames may interfere with subsequent processing of each digital video signal output from processor 74.

Digital data streams A and B from field stores 120–127 are supplied to the two inputs of "mixing and effects" circuit 129. The mix source of circuit 129 (i.e., the factor signal K to be discussed below) may be a constant value for each frame of data read from store 200 or 202, in order to achieve a "fade" between sources A and B.

Circuit 129 preferably has an onboard wipe generation circuit which is capable of generating a time-varying factor signal K. Signal is time-varying in the sense that it has at least one leading or trailing edge during each period when a single field of data is read from store 200 or 202. Circuit 129 also includes circuitry for generating a composite signal from data streams A and B under control of the factor signal K. The composite signal is converted by circuit 140 into a composite video signal by insertion of sync information therein, and is then displayed by a video monitor as a split screen image in which a portion of the "A" image, and a complementary portion of the "B" image, occupy distinct regions of the monitor screen. The wipe generator within circuit 129 is preferably capable of generating rectangular wipes of any size within the output raster, and preferably can be switched on or off at any time in response to control signals from processor 76.

Circuit 129 also includes circuitry for inserting a border signal into the data stream in order to produce a distinctive displayed border which separates the two image regions of the displayed composite signal. Such a distinctive border helps the system user to distinguish a reference image from a test image, since often the test image differs only slightly and subtly from the reference image.

Circuit 129 also includes circuitry for inserting a conventional graphics cursor signal into the composite digital signal asserted at the output of circuit 214. The cursor signal overlays a cursor region of the displayed video output from output processor 74. By operating the input device 28 to change the cursor signal, the user controls the position of the cursor in the displayed video image. In a preferred embodiment, when the displayed cursor highlights a region of a displayed video frame, the user can select color coefficients and parameters to match the highlighted region by entering appropriate commands using the input device 28.

The 8-bit parallel data streams (one 8-bit parallel stream for each of the R,G,B color channels) asserted at the output of circuit 129 is supplied to intermediate frame store circuit 130. The digital data from circuit 129 are written into circuit 130 at a first rate (typically 15 fields per second, which is 7.5 frames per second) and are read out from circuit 130 at four times the first rate (typically, 60 fields per second or 30 frames per second, the proposed standard SMPTE-240M digital video frame rate). Each bit written into circuit 130 is thus read out four times from circuit 130.

Within coding circuit 140, video synchronization signal insertion circuitry inserts conventional digital blanking, sync, and vertical interval data into the horizontal and vertical blanking intervals of the digital data read out from circuit 130. The output of circuit 140 is thus a digital video signal ready for display. Preferably, the inserted sync information is standard high definition digital video sync information (for example, it may satisfy the proposed SMPTE-240M high definition digital video standard), so that the output of circuit 140 is a standard high definition digital color video signal. The sync information is supplied to circuit 140 from an internal timing generator 182 within timing unit 190, which is in turn within control processor 76 (to be described below).

Preferably, coder 140 also inserts encoded "tagging" information into the signal emerging from circuit 130. The tagging information can be a set of color correction or noise reduction parameters useful for performing subsequent color correction or noise reduction processing, or information which identifies artificial frames generated during the 3-2 pulldown process. Identification of the artificial frames in this manner enables subsequent processing systems (such as an EBR system which converts video signals to motion picture film images) to reject (or specially process) the artificial frames from the output of the FIG. 1 system.

The output of coder 140 is an 8-bit color digital video signal. Coder 140 asserts alternate frames of this digital video signal on output lines C and D, for storage, respectively, in frame stores 30 and 31 (shown in FIG. 1).

Figure 8:
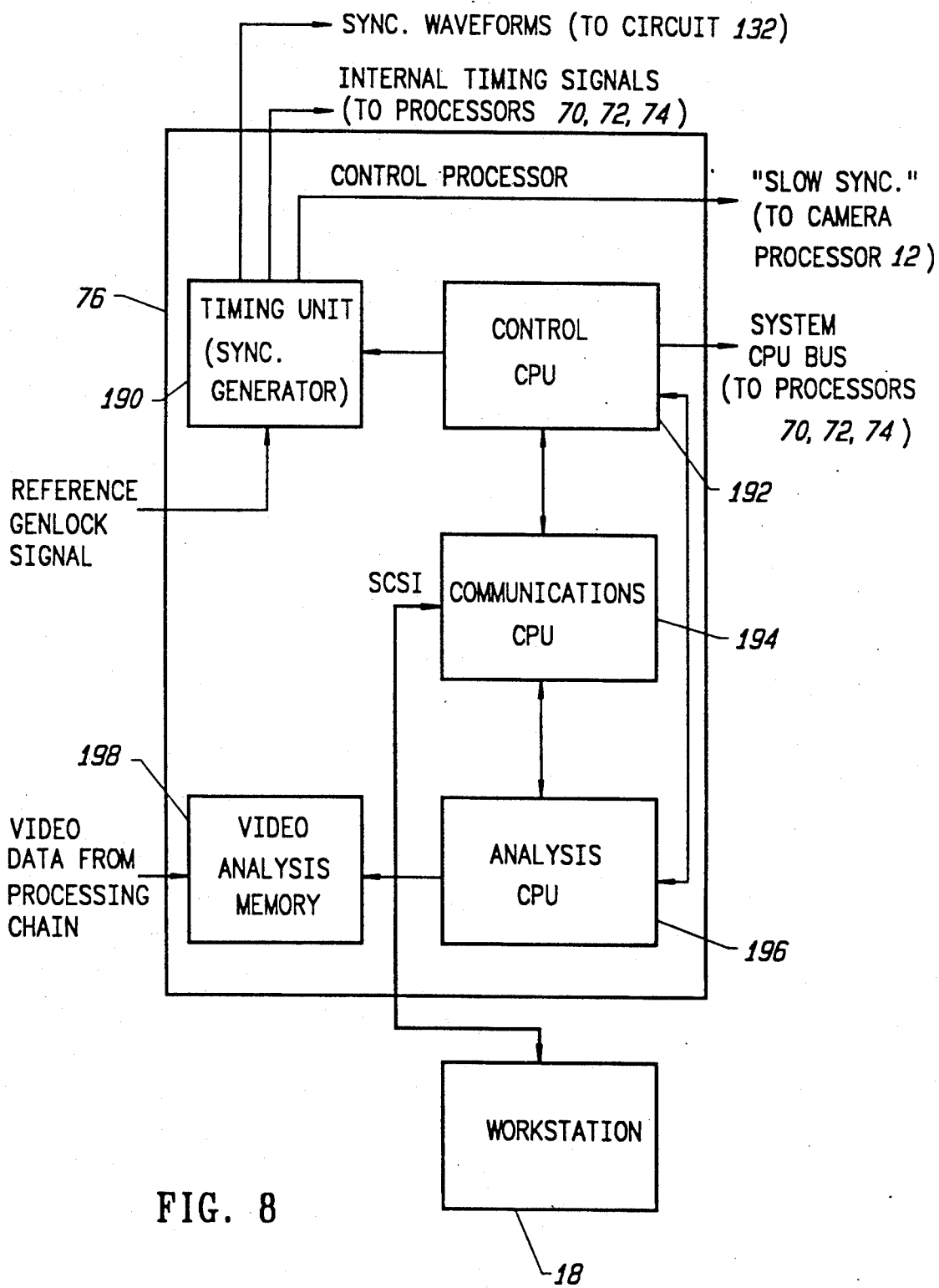
FIG. 8 is block diagram of the control processor shown in FIG. 2.

Control processor 76 of film scanning processor 14 will next be described with reference to FIG. 8. Communications CPU 194 within control processor 76 communicates with computer 18 over an SCSI interface.

The digital data being processed within film scanning processor 14 are supplied to video analysis memory 198. In response to instructions from CPU 194, a data analysis CPU 196 reads data from memory 198, analyzes the data, and sends the analysis results to CPU 194, which relays the results to computer 18.

In response to commands from CPU 194, control CPU 192 sends control signals to timing unit 190, and to the other processing boards within the film scanning processor 14 (input processor 70, digital signal processor 72, and output processor 74).

Figure 9:
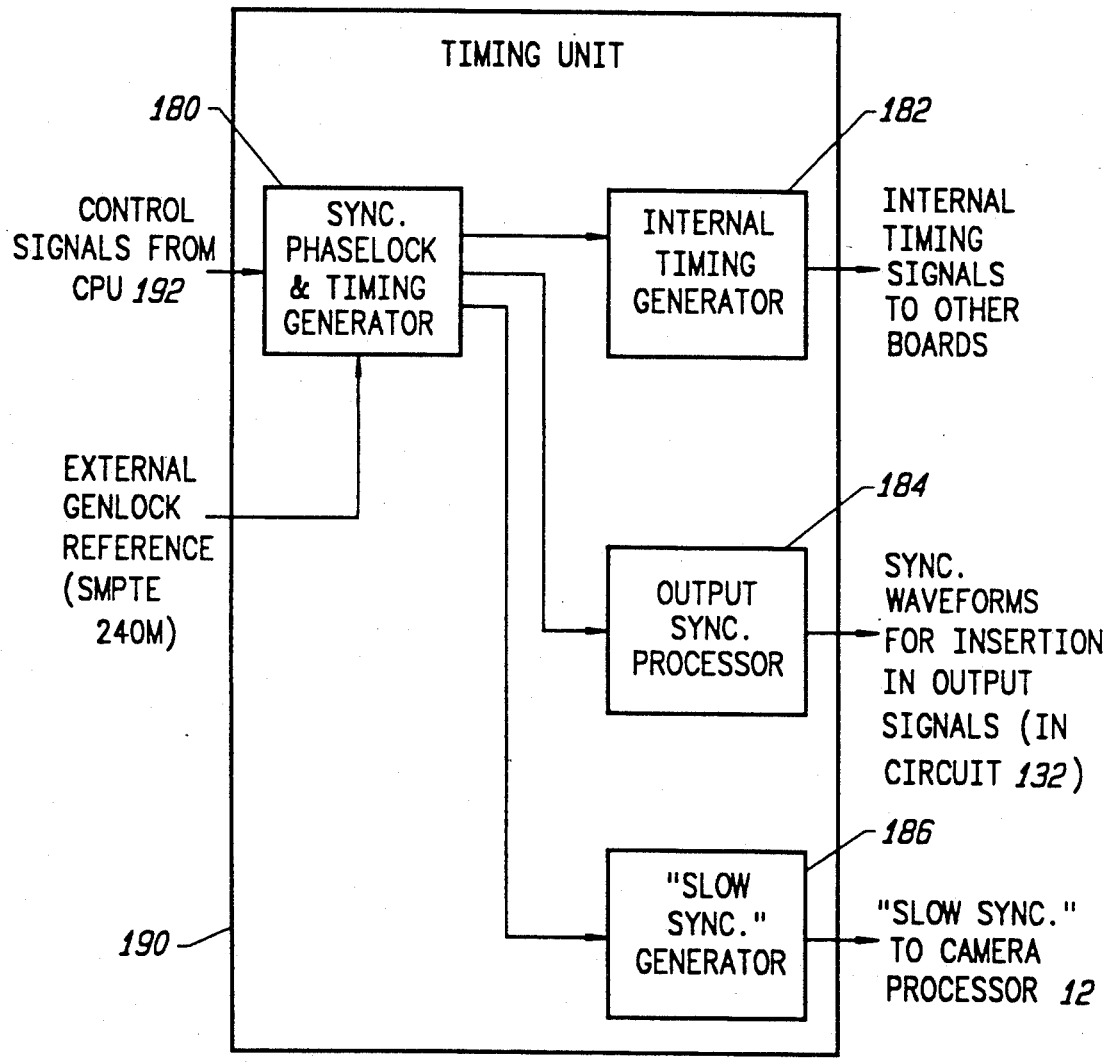
FIG. 9 is block diagram of the timing unit shown in FIG. 8.

With reference to FIG. 9, sync phaselock and timing generator 180 within timing unit 190 receives an external genlock reference signal (preferably an SMPTE-240M genlock reference signal), so that all signals supplied from circuit 180 to the other components of timing unit 190 are phaselocked to the external genlock reference. Slow sync generator 186 generates the above-mentioned low rate synchronization signal ("slow sync") for use by camera processor 12 in response to control signals from CPU 192. Output sync processor 184 generates synchronization waveforms for insertion in circuit 132 into the digital video data stream as described above, in response to control signals from CPU 192. Internal timing generator 182 generates other timing signals for use by processors 70, 72, and 74, in response to control signals from CPU 192.

Displays generated by a preferred embodiment of the inventive system will next be described with reference to FIGS. 10 and 11.

Figure 10:
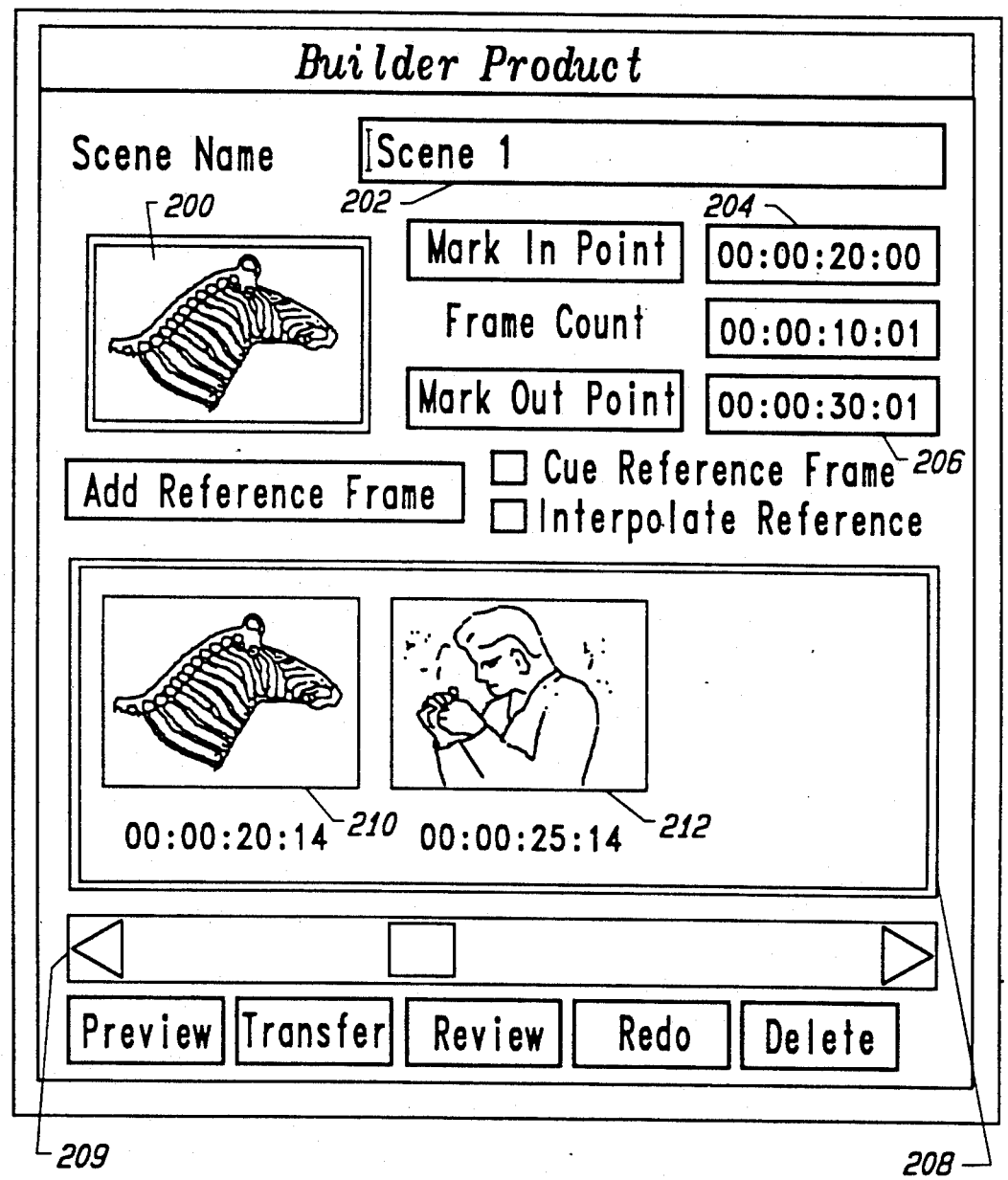
FIG. 10 is a preferred embodiment of a scene information display produced in accordance with the invention, including a scene icon (a compressed image of a film frame which represents a scene of interest).

The system displays the "scene information" display of FIG. 10 on graphics monitor 22 in response to reception by computer 18 of a "scene information" command from input device 28. The scene information display includes a scene icon window 200 and a scene name window 202. Window 202 displays the name of a selected scene, and window 200 displays a scene icon representing the scene whose name appears in window 202. The scene icon is a compressed image of a frame from the selected scene (i.e., a compressed, digitized film frame in the case that the scene has been generated by scanning a motion picture film).

Figure 11:
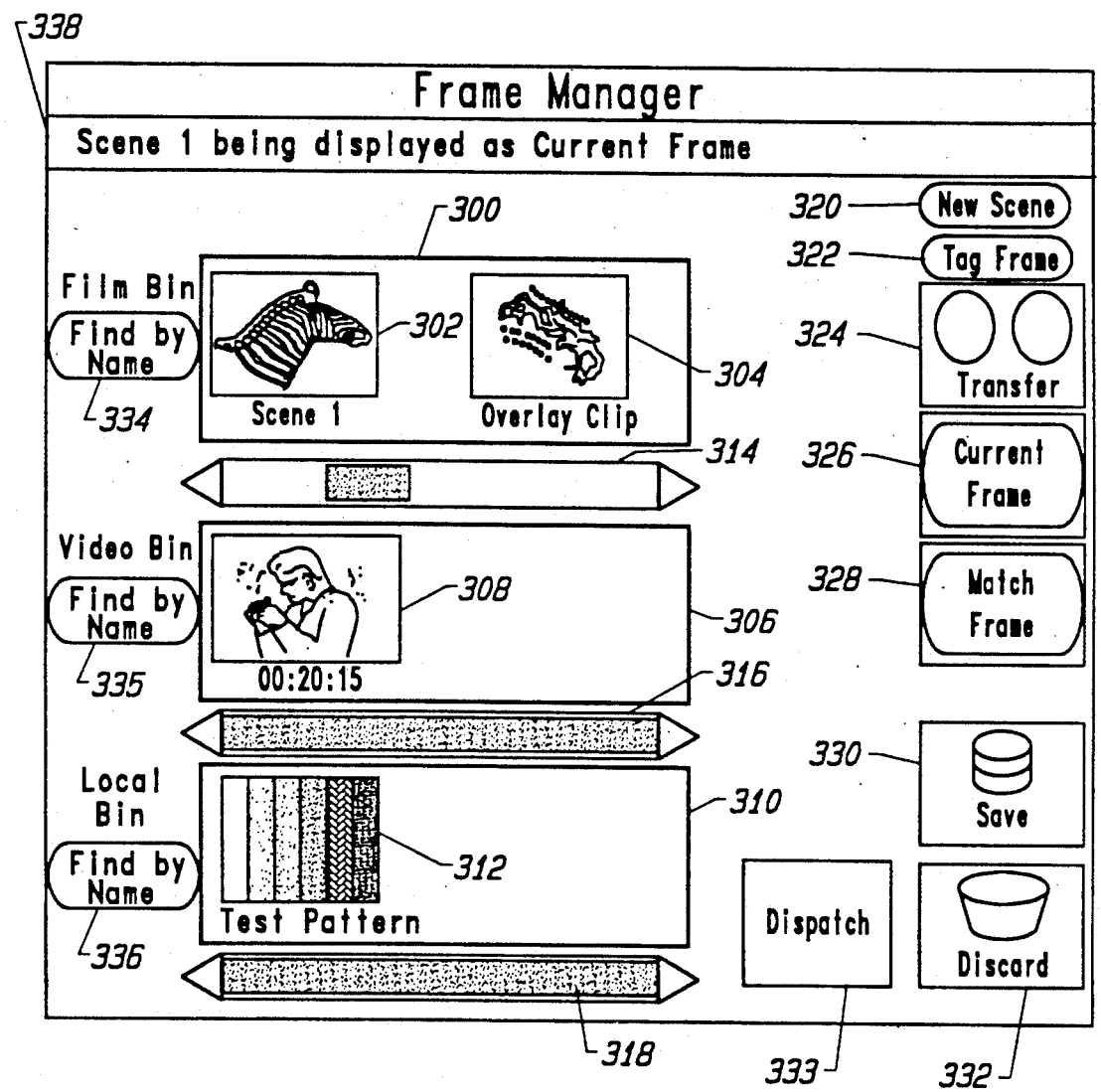
FIG. 11 is a preferred embodiment of user interface display produced in accordance with the invention, including compressed images representing scenes and scene processing icons.

FIG. 11 is a "frame manager" user interface display, which is displayed on graphics monitor 22 by computer 18 in response to a command (entered by the user using input device 28) that computer 18 execute a frame manager software module. The FIG. 11 display (to be referred to as the "frame manager" display) enables the user conveniently to access previously stored or generated scenes from any of three sources: a film bin (represented by window 300); a video bin (represented by window 306); and a local bin (represented by window 310). The frame manager display enables the user conveniently to transfer a scene to any of six destinations: a transfer bin (represented by the icon within window 324); a current frame destination (represented by the icon within window 326); a matching frame destination (represented by the icon within window 328); a save bin (represented by the icon within window 330); a discard bin (represented by the icon within window 332); and a dispatch bin (represented by an icon within window 333).

The frame manager display represents scenes and frames by icons (as does the scene information display of FIG. 10). For example, each of scene icons 302 and 304 within window 300 represents a different scene corresponding to a sequence of digitized motion picture film frames, icon 308 within window 306 represents a single video frame, and icon 312 within window 310 represents a test video frame. The location of icon 308 within video bin window 306 indicates that the third scene corresponds to a sequence of frames from a source video signal; not a sequence of digitized film frames. The location of icon 312 within local bin window 310 indicates that the fourth scene is a locally generated signal (for example, a test pattern signal generated within test signal generator 40 shown in FIG. 4).

Computer 18 is programmed so that the user may transfer a scene from one of the three sources to one of the six destinations by employing input device 28 to drag a desired scene from one of the source windows (300, 306, and 310) to one of the destination icons 324–333. For example, user can drag scene icon 302 from window 300 to the "transfer icon" 324 to copy the scene represented by icon 302 to video tape recorder 34 (more precisely, to a portion of the video tape within recorder 34 that has not previously been recorded onto during the current transfer session).

When the user drags a scene icon to the "current frame" icon 326, the system cues the corresponding scene and displays one frame thereof (known as the "current frame") on video monitor 38. For example, when the system is operated in a split screen video display mode, the current frame is displayed on monitor 38 in the "A" picture area of the split screen display discussed above (with reference to circuit 129 of FIG. 7).

Matching frame icon 328 is employed to update a "matching frame" file within computer 18 which identifies a reference (or "matching") frame image to be displayed on video monitor 38. In the system's split screen mode, the matching frame is displayed in the "B" picture area of the split screen display discussed above with reference to circuit 129. When the user drags a scene icon to the matching frame icon 328, the system causes the corresponding frame (the frame compressed to generate the dragged scene icon) to be displayed as a reference image on monitor 38.

When the user drags a scene icon to the save icon 330, the system copies the corresponding frame (the frame compressed to generate the dragged scene icon) onto a selected one of storage means 24 or 26, or onto an internal storage means (not shown) within computer 18.

When the user drags a scene icon to the discard icon 332, the system removes the corresponding frame from the relevant film, video, or local bin of the frame manager (so that the scene will no longer be displayed in window 300, 306, or 308), without deleting any previously transferred copies of the scene from video tape recorder 34.

When the user drags a scene icon (such as scene icon 302) to the dispatch icon 333, the system queues the scene to be copied to video tape recorder 34. The system will then copy the scene to recorder 34 when the user issues an appropriate command at some future time.

To create a scene, the user operates input device 28 to command the system to execute the frame manager software module. In response to this command, the system will generate the frame manager display of FIG. 11. The user then operates input device 28 to select "New Scene" icon 320. In response the system compresses the "current frame" signal (a signal which at that instant is stored in field stores 120 of output processor 74, and is displayed as a still frame on monitor 38), to generate a scene icon representing the new scene. The current frame is identified in window 326 of the FIG. 11 display.

Upon creation of a new scene, the system assigns the time code of the current frame as the default "in" point of the new scene. When the user initiates the scene information display (shown in FIG. 10), the default "in" point is displayed in window 204 of the scene information display. While viewing the scene information display, the user can change the "in" point displayed in window 204 by editing the text displayed in window 204 or selecting the icon designated "Mark In Point" which causes the "in" point to be assigned the frame index value of the "current frame." Similarly, the user can define (or change) an "out" point displayed in window 206, by entering or editing text displayed in window 206, or by selecting the icon designated "Mark Out Point," which causes the "out" point to be assigned the frame index value of the "current frame."

With reference again to FIG. 11, in response to selection of the "Tag frame" icon 322, the system adds the current frame to one of the frame manager source bins (the frame is treated as a scene comprising a single frame). If the source of the current frame is a video tape (or other video signal storage medium), the system automatically assigns the current frame to the video bin. Similarly, if the current frame is a digitized film frame, the system assigns it to the film bin.

Slider window 314 corresponds to the film bin, slider window 316 corresponds t o the video bin, and slider window 318 corresponds to the local bin. By manipulating input device 28 to move a cursor into one of the slider windows and moving the cursor to the right (or to the left), the user causes the system to display (sequentially) the scene icons assigned to the corresponding bin in the relevant one of windows 300, 306, and 310.

Another convenient way for the user to display a desired scene icon in one of windows 300, 306, and 310 is to select the "find by name" icon (334, 335, or 336) adjacent the desired source bin. Upon selection of one of icons 334–336 (such as by "clicking" on the icon with a trackball or mouse embodiment of input device 28), the system displays a pulldown menu including a list of scene names. The user may then manipulate input device 28 to select any scene name on the list.

Referring again to FIG. 10, window 208 displays "reference icons" (such as icons 210 and 212), each of which represents a set of color adjustment parameters that may be applied to the scene identified in windows 200 and 202. Any number of reference icons may be assigned to a reference frame bin for the scene, but only a limited number (for example, two) of such icons can be displayed in window 208 at any time. A command can be entered by the user to cause the display device to increase the number of icons displayed in window 208.

Slider 209 (which is employed in the same manner as each of sliders 314, 316, and 318 discussed above) enables the user to scroll (i.e., sequentially display) all the reference icons in a scene's reference bin.

The FIG. 10 display permits convenient assignment of color adjustment parameters to a scene by enabling users to add reference frames to the scene's reference bin. In response to user selection of the icon designated "Add Reference Frame," the system assigns to the scene a reference frame, which consists of a set of color adjustment parameters associated with the "current frame" and the position of the "current frame" in the scene's sequence of frames. The reference frame information (including the assigned color adjustment parameters) can be transferred as a unit with the other signal components that comprise the scene. Thus, for example, upon storage of the scene in video format on a video tape, the color adjustment parameters are also stored on the video tape.

If the system has been placed in the "Cue Reference Frame" mode by a user-issued command, selection of a reference icon displayed in window 208 (such as by manipulating input device 28 to select the desired displayed reference icon), the source frame which produces the selected icon is displayed as the "current frame" and the corresponding color correction parameters are loaded. If the system is not in the "Cue Reference Frame" mode, only the corresponding color parameters are loaded in response to selection of a reference icon displayed in window 208.

The user can sequentially select two or more reference icons from the scene's reference bin. The time code associated with each reference frame is displayed in window 208 under the corresponding reference icon (the reference frame time codes fall within the range bounded by the "in" and "out" points of the scene). The reference frame time code corresponding to each selected reference frame is assigned to the scene along with the color adjustment parameters corresponding to the selected reference frame.

The system operates in either of two color adjustment modes, known as the "best fit" and "linear interpolation" modes. In both modes, when the user has selected only one reference icon for a scene (in the manner described in the two preceding paragraphs), the system simply assigns the single set of color adjustment parameters associated with the reference icon to all frames of the scene. The two modes differ when two or more reference frames (and hence two or more reference icons) have been selected for a scene.

In the linear interpolation mode, when two or more reference frames are assigned to a scene the system computes color adjustment parameters for scene frames between each pair of reference frames ("intermediate" scene frames) using a weighted average. Thus, intermediate frames between each pair of adjacent reference frames are assigned individual interpolated color adjustment parameters.

In the best fit mode, when two or more reference frames have been selected for a scene the system computes a single "best" set of color adjustment parameters for all scene frames by processing the color adjustment parameters associated with all the selected reference frames.

The window designated "Interpolate Reference" (shown in FIG. 10) displays information indicating whether the system is in the "best fit" or "linear interpolation" mode.

The window designated "Cue Reference Frame" (shown in FIG. 10) displays information indicating whether the system has been commanded to enter a "cue reference" mode. In such mode, upon selection of a reference icon from the reference bin, the system will not only add the corresponding color adjustment parameters to the scene but will also assign the selected reference icon as the system's "current frame."

The icon designated "Transfer" in the scene information display of FIG. 10 has a function analogous to that of transfer icon 324 of FIG. 11. When the user selects the Transfer icon of FIG. 10 using input device 28, the system copies the scene represented by icon 200 to video tape recorder 34.

Selection of the icon designated "Redo" (in FIG. 10) causes the system to overwrite the scene represented by icon 200 onto a portion of video tape (within video tape recorder 34) on which the scene had previously been written.

Selection of the icon designated "Preview" (in FIG. 10) causes computer 18 to instruct device controller 20 to generate control signals for film scanner 10 and camera processor 12. These control signals cue the film scanner to the first frame of the scene named in window 202, and instruct the film scanner and camera processor to scan the entire scene. The resulting scanned film signals can be displayed on monitor 16. Alternatively, the scanned film signals can be digitized in input processor 70 (within processor 14), then routed through digital signal processor 72 (without undergoing color correction therein) and processor 74 (in which they are converted to video form), and then displayed on monitor 38. In this way, the user can preview the scanned film images before they are color corrected in processor 72.

Selection of the icon designated "Review" (in FIG. 10) causes computer 18 to instruct device controller 20 to generate control signals for video tape recorder ("VTR") 34. These control signals cue VTR 34 to the first frame of the scene named in window 202, and instruct the VTR to play back the entire scene for display on video monitor 38. The scene played back by VTR 34 will have undergone color correction in digital signal processor 72 (in accordance with the color adjustment parameters assigned to the scene) before being recorded on VTR 34. In this way, the user can review scanned film images comprising a scene after the images have undergone color correction.

Selection of the icon designated "Delete" (in FIG. 10) removes the scene represented by icon 200 from the relevant film bin of the frame manager (so that the scene will no longer be displayed in window 300 of FIG. 11), without deleting any previously transferred copies of the scene from video tape recorder 34.

As mentioned, computer 18 is programmed to assign a default name to each scene upon creation of the scene, and to display the default name in window 202. The default name can have the form "Scene [integer]" as does the name "Scene 1" shown in window 202 in FIG. 10. The user can change the scene name by editing the text in window 202.

The system displays the time code of the first film frame (the "in" point) of the scene and the time code of the last film frame (the "out" point) of the scene in windows 204 and 206. As mentioned, the user can change the "in" and "out" points be editing the text displayed in windows 204 and 206.

The scene information display of FIG. 10 can be displayed as a pop-up window within the FIG. 11 display, when the user "clicks" on one of the scene icons displayed in FIG. 11 using input device 28.

Throughout the specification (including in the claims), the term "set" denotes a collection comprising one or more members. For example, the expression "set of scene processing icons" denotes one or more scene processing icons.

Throughout the specification (including in the claims), the phrase "frame signal" (or "frame") denotes a signal including digital data representing a film or video image, and optionally also including additional data such as digital sync data. For example, the expression "frame signal representing a digitized film image" denotes a signal which includes a set of pixels comprising a digitized film image (not merely frame sync data).

Various modifications and alterations in the described system and method of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for processing digital signals representing digitized film images, including:
   means for generating a scene signal representing a first sequence of digitized film images;
   means for storing a frame signal representing a digitized film image selected from the first sequence of digitized film images;
   means for compressing the frame signal to generate a scene icon;
   means for generating a set of scene processing icons, where each scene processing icon in the set represents a scene processing operation;
   means for displaying the set of scene processing icons and means for displaying scene data in response to a user command for information regarding the scene signal, wherein said scene data includes the scene icon;

means for selecting individual ones of the displayed scene processing icons; and means for processing the scene signal in response to selection of individual ones of the displayed scene processing icons.

2. The system of claim 1, also including a first storage means and a second storage means, wherein the scene signal is stored in the first storage means, wherein the set of scene processing icons includes a scene transfer icon, and wherein the means for processing the scene signal includes a means for transferring the scene signal from the first storage means to the second storage means in response to selection of the scene transfer icon.

3. The system of claim 1, wherein the scene signal includes digital data identifying a set of color adjustment parameters for color correcting at least one of the digitized film images in the first sequence.

4. The system of claim 3, wherein the set of color adjustment parameters includes a first set of color adjustment parameters for color correcting a first digitized film image in the first sequence, and a second set of color adjustment parameters for color correcting a second digitized film image in the first sequence.

5. The system of claim 1, wherein the scene signal is a video signal, and also including:

video signal storage means for storing the scene signal.

6. The system of claim 5, wherein the scene signal includes digital data identifying a set of color adjustment parameters for color correcting a first digitized film image in the first sequence, and digital data identifying a video storage location for the scene signal.

7. The system of claim 1, wherein the means for displaying scene data also includes a means for displaying reference icons, wherein each of the reference icons represents a set of color adjustment parameters, and wherein the means for processing the scene signal includes a means for assigning a set of color adjustment parameters to the scene signal in response to selection of one of the reference icons.

8. The system of claim 1, also including a video storage means, and wherein the means for displaying scene data also includes a means for displaying a transfer icon, and wherein the means for processing the scene signal includes a means for copying the scene signal to the video storage means in response to selection of the transfer icon.

9. The system of claim 8, wherein a second scene signal is stored in the video storage means, wherein the means for displaying scene data also includes a means for displaying a redo icon, and wherein the means for processing the scene signal includes a means for storing the scene signal in place of the second scene signal in the video storage means, in response to selection of the redo icon.

10. The system of claim 1, also including film scanning means for converting a first sequence of film images to said first sequence of digitized film images, wherein the means for displaying scene data also includes a means for displaying a preview icon, and wherein the means for processing the scene signal includes means for commanding the film scanning means to convert the first sequence of film images to the first sequence of digitized film images, in response to selection of the preview icon.

11. The system of claim 1, wherein the means for generating a scene signal includes a means for generating a number of scene signals, each representing a sequence of images, and also including:

a video storage means;

a means for compressing portions of the scene signals to generate scene icons, each representing a different one of the scene signals;

means for displaying a set of source bin windows, with at least one of the scene icons displayed in each of the source bin windows, wherein the means for selecting individual ones of the displayed scene processing icons includes means for selecting individual displayed ones of the scene icons;

means for displaying a transfer icon; and means for copying a first one of the scene signals to the video storage means in response to selection of the transfer icon and a first one of the scene icons representing the first one of the scene signals.

12. The system of claim 1, wherein the means for displaying the set of scene processing icons includes a means for displaying a current scene icon, wherein the means for selecting individual ones of the displayed scene processing icons includes a means for selecting the displayed current scene icon and the displayed scene icon, and also including:

a video monitor for displaying the frame signal; and a means for transferring the frame signal to the video monitor for display, in response to selection of the scene icon and the current scene icon.

13. The system of claim 1, also including:

means for storing a reference frame signal;

means for generating a reference icon representing the reference frame signal;

a video monitor for displaying the reference frame signal; and wherein the means for displaying the set of scene processing icons includes:

a means for displaying the reference scene icon;

a means for displaying a reference frame icon; and a means for transferring the reference frame signal to the video monitor for display, in response to selection of the reference scene icon and the reference frame icon.

14. The system of claim 1, wherein the scene icon corresponds, when displayed, to the selected film image reduced in size by a predetermined factor.

15. The system of claim 14, also including a first storage means and a second storage means, wherein the scene signal is stored in the first storage means, wherein the set of scene processing icons includes a scene transfer icon, and wherein the means for processing the scene signal includes a means for transferring the scene signal from the first storage means to the second storage means in response to selection of the scene transfer icon by the user of the system.

16. The system of claim 14, wherein the scene signal includes digital data identifying a set of color adjustment parameters for color correcting at least one of the digitized film images in the first sequence.

17. A film scanning system, including:

means for digitally performing color correction on a digital signal representing a sequence of scanned film frames, to generate a corrected signal representing color corrected film frames;

means for inserting video sync information and scene data into the corrected signal to generate a scene signal, wherein the scene signal represents the color corrected film frames, and wherein the scene signal includes a frame portion representing a first one of the color corrected film frames;

video signal storage means for storing the scene signal;

frame storage means for storing the frame portion;

means for compressing the frame portion to generate a scene icon;

means for generating a set of scene processing icons, where each scene processing icon in the set represents a scene processing operation;

means for displaying the set of scene processing icons, and means for displaying scene data in response to a user command for information regarding the scene signal, wherein the scene data includes the scene icon;

means for selecting individual ones of the displayed scene processing icons; and means for processing the scene signal in response to selection of selected ones of the displayed scene processing icons.

18. The system of claim 17, wherein the scene data identifies a set of color adjustment parameters for color correcting at least some of the color corrected film frames.

19. The system of claim 18, wherein the scene signal includes digital data representing a first film frame, digital data representing a second film frame, and wherein the set of color adjustment parameters includes a first set of color adjustment parameters for color correcting the first digitized film frame and a second set of color adjustment parameters for color correcting the second digitized film frame.

20. The system of claim 17, wherein the means for displaying scene data includes a means for displaying reference icons representing sets of color adjustment parameters, and wherein the means for processing the scene signal includes a means for inserting one of said sets of color adjustment parameters into the scene signal in response to selection of one of the reference icons.

21. The system of claim 17, wherein the means for displaying scene data also includes a means for displaying a transfer icon, and wherein the means for processing the scene signal includes a means for copying the scene signal to the video signal storage means in response to selection of the transfer icon.

22. The system of claim 17, wherein a second scene signal is stored in the video signal storage means, wherein the means for displaying scene data also includes a means for displaying a redo icon, and wherein the means for processing the scene signal includes a means for storing the scene signal in place of the second scene signal in the video signal storage means, in response to selection of the redo icon.

23. The system of claim 17, also including a film scanning means for converting a sequence of film frames into said digital signal, wherein the means for displaying scene data also includes a means for displaying a preview icon, and wherein the means for processing the scene signal includes means for commanding the film scanning means to convert the sequence of film frames into said digital signal, in response to selection of the preview icon.

24. A method for processing digital signals representing digitized film images, including the steps of:

storing a frame signal representing a digitized film image selected from a first sequence of digitized film images;

generating a scene signal representing the first sequence of digitized film images;

generating a set of scene processing icons, where each scene processing icon in the set represents a scene processing operation;

displaying the set of scene processing icons;

compressing the frame signal to generate a scene icon;

displaying scene data in response to a user command for information regarding the scene signal, wherein the scene data includes the scene icon;

selecting individual ones of the displayed scene processing icons; and processing the scene signal in response to selection of selected ones of the displayed scene processing icons.

25. The method of claim 24, wherein the set of scene processing icons includes a scene transfer icon, and also including the steps of:

storing the scene signal in a first storage location;

transferring the scene signal from the first storage location to a second storage location in response to selection of the scene transfer icon.

26. The method of claim 24, wherein the scene signal includes digital data identifying a set of color adjustment parameters for color correcting at least one of the digitized film images in the first sequence.

27. The method of claim 24, wherein the set of color adjustment parameters includes a first set of color adjustment parameters for color correcting a first digitized film image in the first sequence, and a second set of color adjustment parameters for color correcting a second digitized film image in the first sequence.

28. The method of claim 24, wherein the step of displaying scene data includes the step of displaying reference icons representing sets of color adjustment parameters, and also including the step of:

assigning one of the sets of color adjustment parameters to the scene signal in response to selection of one of the reference icons.

29. The method of claim 24, wherein the set of scene processing icons includes a transfer icon, and including the step of:

copying the scene signal to the video signal storage means in response to selection of the transfer icon.

30. The method of claim 29, wherein a second scene signal is stored in the video signal storage means, wherein the set of scene processing icons includes a redo icon, and also including the step of:

storing the scene signal in place of the second scene signal in the video signal storage means, in response to selection of the redo icon.

31. The method of claim 24, wherein the set of scene processing icons includes a preview icon, and also including the step of:

converting a first sequence of film images to said first sequence of digitized film images in response to selection of the preview icon.

32. A film scanning method, including the steps of:

digitally performing color correction on a digital signal representing a sequence of scanned film frames, to generate a corrected signal representing color corrected film frames;

inserting video sync information and scene data into the corrected signal to generate a scene signal, wherein the scene signal represents the color corrected film frames, and wherein the scene signal includes a frame portion representing a first one of the color corrected film frames;

storing the scene signal and separately storing the frame portion;

generating a set of scene processing icons, where each scene processing icon in the set represents a scene processing operation;

displaying the set of scene processing icons;

compressing the frame portion to generate a scene icon;

displaying scene data in response to a user command for information regarding the scene signal, wherein the scene data includes the scene icon;

selecting individual ones of the displayed scene processing icons; and processing the scene signal in response to selection of selected ones of the displayed scene processing icons.

33. The method of claim 32, wherein the scene data identifies a set of color adjustment parameters for color correcting at least some of the color corrected film frames.

34. The method of claim 32, wherein the scene signal includes digital data representing a first film frame, digital data representing a second film frame, and wherein the set of color adjustment parameters includes a first set of color adjustment parameters for color correcting the first digitized film frames and a second set of color adjustment parameters for color correcting the second digitized film frame.

* * * * *